US011228511B2

(12) United States Patent
Pan et al.

(10) Patent No.: US 11,228,511 B2
(45) Date of Patent: Jan. 18, 2022

(54) SMART SAMPLING OF DISCRETE MONITORING DATA

(71) Applicant: International Business Machines Corporation, Armonk, NY (US)

(72) Inventors: Tian Ming Pan, Beijing (CN); Peng Fei Tian, Beijing (CN); Bo Chen Z Zhu, Xi'an (CN); Chu Yun Cloud Tony, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 16/356,114

(22) Filed: Mar. 18, 2019

(65) Prior Publication Data

US 2020/0304387 A1    Sep. 24, 2020

(51) Int. Cl.
*H04L 12/26* (2006.01)
*G06F 11/30* (2006.01)

(52) U.S. Cl.
CPC .......... *H04L 43/024* (2013.01); *G06F 11/302* (2013.01); *G06F 11/3006* (2013.01); *H04L 43/04* (2013.01); *H04L 43/14* (2013.01)

(58) Field of Classification Search
CPC ............. G06F 2201/81; G06F 11/3409; G06F 11/3452; G06F 11/3476; G06F 11/3072; G06F 11/0754; G06F 11/3466; G06F 2201/86; G06F 11/3003; G06F 11/3447; G06F 11/30; G06F 17/18; G06F 17/40;

(Continued)

(56) References Cited

U.S. PATENT DOCUMENTS 9,746,529 B2    8/2017  Maa et al.
2007/0038744 A1*  2/2007  Cocks ................. H04L 43/0817
                                                        709/224

(Continued)

FOREIGN PATENT DOCUMENTS

JP    2009122820 A    6/2009

OTHER PUBLICATIONS

Beatriz et al.; "Knowledge-based Performance Monitoring for Large Scale HPC Architectures"; Technische Universiat at Munchen; Feb. 2, 2015; 170 pages.

(Continued)

*Primary Examiner* — Minh Chau Nguyen
*Assistant Examiner* — Mehulkumar J Shah
(74) *Attorney, Agent, or Firm* — Cantor Colburn LLP; Teddi Maranzano

(57) ABSTRACT

A computer-implemented method for recommending a monitoring interval in provided. A non-limiting example of the computer-implemented method includes receiving, by a processor, monitoring data at an initial monitoring interval and calculating, by the processor, a set of aggregation data from the monitoring data including a first subset of aggregation data at a first interval of the initial monitoring interval. The method calculates, by the processor, a first density score for the first subset of aggregation data and a first indicator score for the first subset of aggregation data and provides, by the processor, the first interval as a recommended interval when the first density score does not exceed a density threshold and the first indicator threshold does not exceed an indicator threshold.

20 Claims, 7 Drawing Sheets

(58) Field of Classification Search
CPC ............... G06F 11/302; G06F 11/3006; G06F 11/3082; G06F 11/3433; G06F 11/34; H04L 43/08; H04L 43/16; H04L 41/0681; H04L 41/12; H04L 41/147; H04L 43/0876; H04L 41/14; H04L 43/024; H04L 43/04; H04L 43/14; H04L 12/26
USPC .................. 709/224, 223; 340/16.1; 370/252; 714/47.1
See application file for complete search history.

(56) References Cited

U.S. PATENT DOCUMENTS

| | | |
|---|---|---|
| 2007/0112635 A1 | 5/2007 | Loncaric |
| 2007/0167150 A1* | 7/2007 | Hutcheson ........... G06Q 20/102 455/405 |
| 2008/0086469 A1* | 4/2008 | Gu ..................... G06F 11/3447 |
| 2010/0013634 A1 | 1/2010 | Kanna |
| 2013/0346367 A1 | 12/2013 | Trugman et al. |
| 2014/0074559 A1 | 3/2014 | Karunakaran |
| 2014/0172503 A1* | 6/2014 | Hammerstrom ... G06Q 30/0206 705/7.31 |
| 2015/0127299 A1 | 5/2015 | Maa et al. |
| 2016/0104076 A1* | 4/2016 | Maheshwari .......... G06N 20/00 706/12 |
| 2017/0155570 A1* | 6/2017 | Maheshwari ........... H04L 43/50 |
| 2018/0060127 A1* | 3/2018 | Esterkin ................ G06F 11/302 |
| 2019/0066143 A1* | 2/2019 | Dasar ................. G06Q 30/0223 |

OTHER PUBLICATIONS

Mell et al.; "The NIST Definition of Cloud Computing-Recommendations of the National Institute of Standards and Technology"; U.S. Department of Commerce; Sep. 2011; 7 pages.

Tang et al.; "Slope monitoring information management system based on WebGIS" (Abstract Only); Saved from the World Wide Web Aug. 18, 2018; <http://en.cnki.com.cn/Article_en/CJFDTOTAL-CHGC201105012.htm>; 2 pages.

\* cited by examiner

710

| $T_D$ | $x_D$ |
|---|---|
| 3% | 1s, 5s, 10s, 20s, 25s, 30s |
| 5% | 1s, 5s, 10s, 15s, 20s, 25s, 30s, 35s, 45s, |
| 8% | 1s, 5s, 10s, 15s, 20s, 25s, 30s, 35s, 45s, 50s |
| 10% | ≤2min |
| 15% | ≤5min |

720

| $T_i$ | $x_i$ |
|---|---|
| 3% | ≤15s |
| 5% | ≤1min |
| 8% | ≤80s |
| 10% | ≤2min |
| 15% | ≤3min |

730

| $T_D$ \ $T_i$ | 3% | 5% | 8% | 10% | 15% |
|---|---|---|---|---|---|
| 3% | 10s (7%) | 30s (10%) | 30s (10%) | 30s (10%) | 30s (10%) |
| 5% | 15s (9%) | 45s (13%) | 45s (13%) | 45s (13%) | 45s (13%) |
| 8% | 15s (9%) | 50s (14%) | 50s (14%) | 50s (14%) | 50s (14%) |
| 10% | 15s (9%) | 1min (16%) | 80s (18%) | 2min (20%) | 2min (20%) |
| 15% | 15s (9%) | 1min (16%) | 80s (18%) | 2min (20%) | 3min (20%) |

FIG. 7

SMART SAMPLING OF DISCRETE MONITORING DATA

BACKGROUND

The present invention generally relates to data monitoring, and more specifically, to the smart sampling of discrete monitoring data.

Monitoring data relating to system or application function is an important part of system and application implementation. Those who implement such systems want to collect as much data as possible without overly taxing the system. But, it takes system resources to monitor and collect this data. Resources devoted to data collection for monitoring system performance are necessarily not available for the primary tasks of system and application functioning.

SUMMARY

Embodiments of the present invention are directed to a computer-implemented method for recommending a monitoring interval. A non-limiting example of the computer-implemented method includes receiving, by a processor, monitoring data at an initial monitoring interval and calculating, by the processor, a set of aggregation data from the monitoring data including a first subset of aggregation data at a first interval of the initial monitoring interval. The method calculates, by the processor, a first density score for the first subset of aggregation data and a first indicator score for the first subset of aggregation data and provides, by the processor, the first interval as a recommended interval when the first density score does not exceed a density threshold and the first indicator threshold does not exceed an indicator threshold.

Embodiments of the present invention are directed to a system for recommending a monitoring interval. A non-limiting example of the system includes a processor and a memory communicatively coupled to the processor. The memory has stored therein instructions that when executed cause the processor to receive monitoring data at an initial monitoring interval and calculate a set of aggregation data from the monitoring data including a first subset of aggregation data at a first interval of the initial monitoring interval. The instructions also cause the processor to calculate a first density score for the first subset of aggregation data and a first indicator score for the first subset of aggregation data and provide the first interval as a recommended interval when the first density score does not exceed a density threshold and the first indicator threshold does not exceed an indicator threshold.

Embodiments of the invention are directed to a computer program product for recommending a monitoring interval, the computer program product comprising a computer readable storage medium having program instructions embodied therewith. The program instructions are executable by a processor to cause the processor to perform a method. A non-limiting example of the method includes receiving monitoring data at an initial monitoring interval and calculating a set of aggregation data from the monitoring data including a first subset of aggregation data at a first interval of the initial monitoring interval. The method calculates a first density score for the first subset of aggregation data and a first indicator score for the first subset of aggregation data and provides the first interval as a recommended interval when the first density score does not exceed a density threshold and the first indicator threshold does not exceed an indicator threshold.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts three tables showing an example output of the method according to embodiments of the invention.

Figure 1:
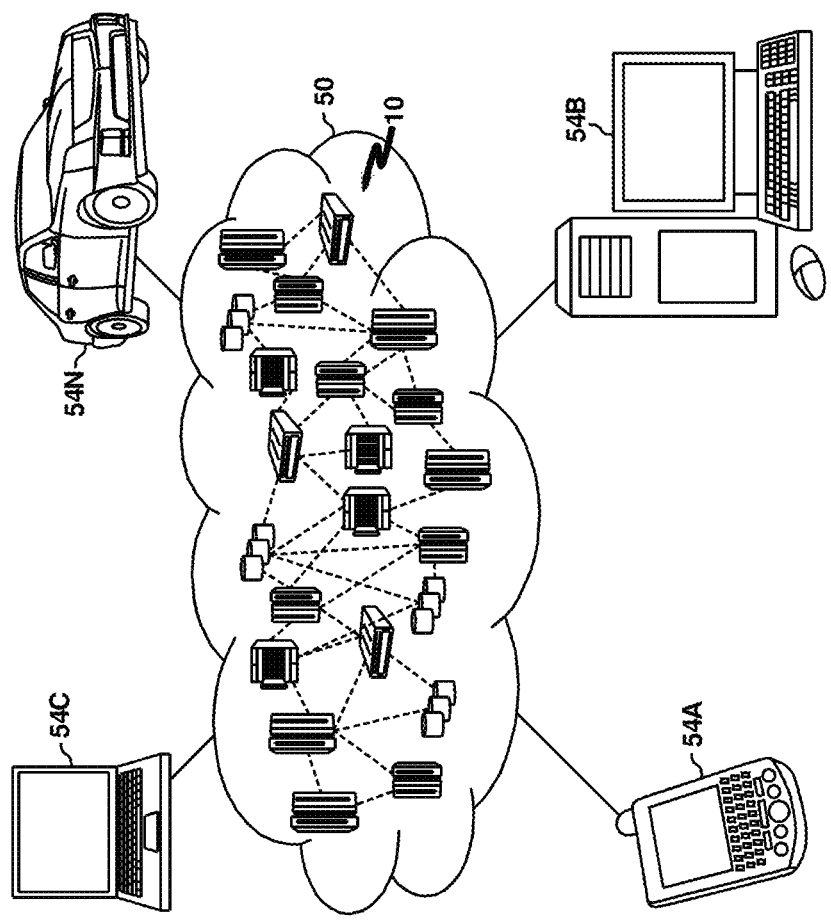
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
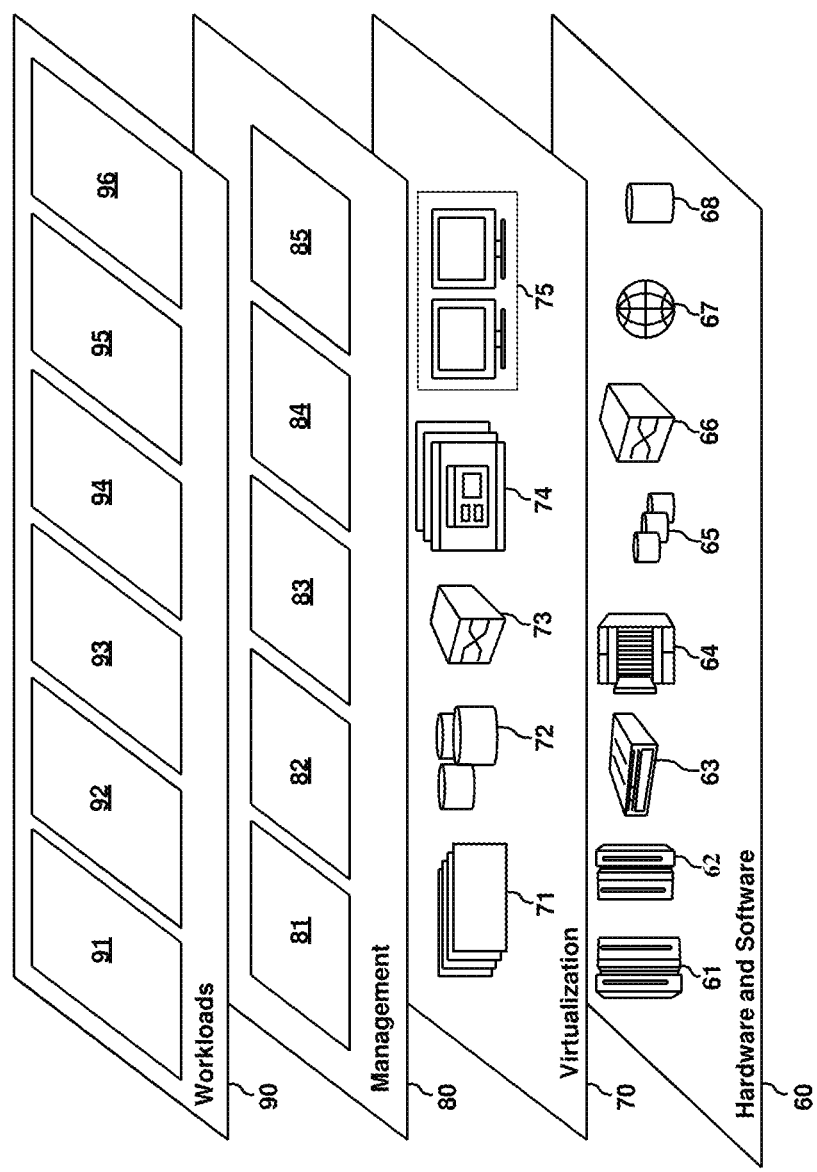
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; smart sampling processing 95; and recommendation processing 96.

Figure 3:
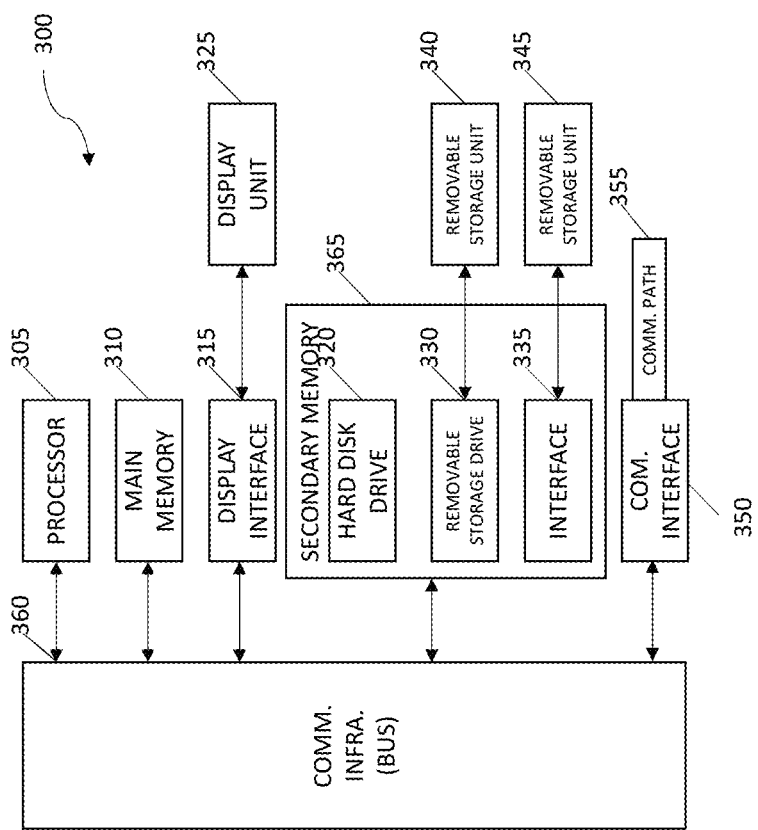
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, monitoring of systems and applications is very important to help detect and fix issues at an early stage. Users want to monitor as much detailed information as they can and provide themselves with enough data for debugging and analyzing. When there are issues in the system, users want to figure out the root cause based on the monitoring data. Users can not only get to know the root cause of the current issue, but also avoid similar issues happening in the future based on the experience they get from analyzing the monitoring data.

In most cases, it is impractical for users to collect as much data as they can. However, there are several problems with collecting fast amounts of data on a frequent basis. First, it is too expensive. Users want most of the system resources spent on the applications which can make money for them. Collecting the monitoring data is useful for system management and operations, but not central to system management and operations. It does not make sense for users to allocate too many system resources on the monitoring of data.

Second, it is hard to analyze the vast troves of data. It is a huge amount of work to analyze and find the root cause of an issue if users collect as much data as they can. Because a system operates normally most of the time most of the monitoring data is about normal situations. Users do not need too much data about normal situations but need more detailed data when there are abnormal situations.

Third, it is hard to determine a strategy of collecting monitoring data. Users need a strategy that can help both collect enough data for debugging of issues and reduce system cost by collecting only part of the data. Reducing the amount of data that is collected is important if users want to save cost. Users need a method that can help them figure out a strategy of collecting monitoring data. The strategy will both help user reduce the amount of collecting data and keep the key insights for problem debugging.

Turning now to an overview of the aspects of the invention, one or more embodiments of the invention address the above-described shortcomings of the prior art by providing a method that will both help users reduce the amount of collecting data and keep the key insights for debugging problems.

The above-described aspects of the invention address the shortcomings of the prior art by proving a methodology based on analytics and machine learning on historical data to figure out relationships between the system cost and monitor the effect on discrete collected data. A new metric for performance in peak hours is introduced in this methodology to better describe a system health indicator. With the evaluation of different monitoring strategies, there will be a recommendation list of monitor intervals generated to aid users in decisions about which will be the best one for a specific environment.

The methodology provides a method to split input data into different kinds of the training set. It also provides a method to measure the general distribution of monitoring data by a density distribution function. It will measure abnormal performance in discrete monitoring data and generates a score of each kind of interval for evaluation of which interval is the best. It also provides an evaluation method that involves an indicator module and density module that provides a score for each interval and proposes the best monitoring interval.

Figure 4:
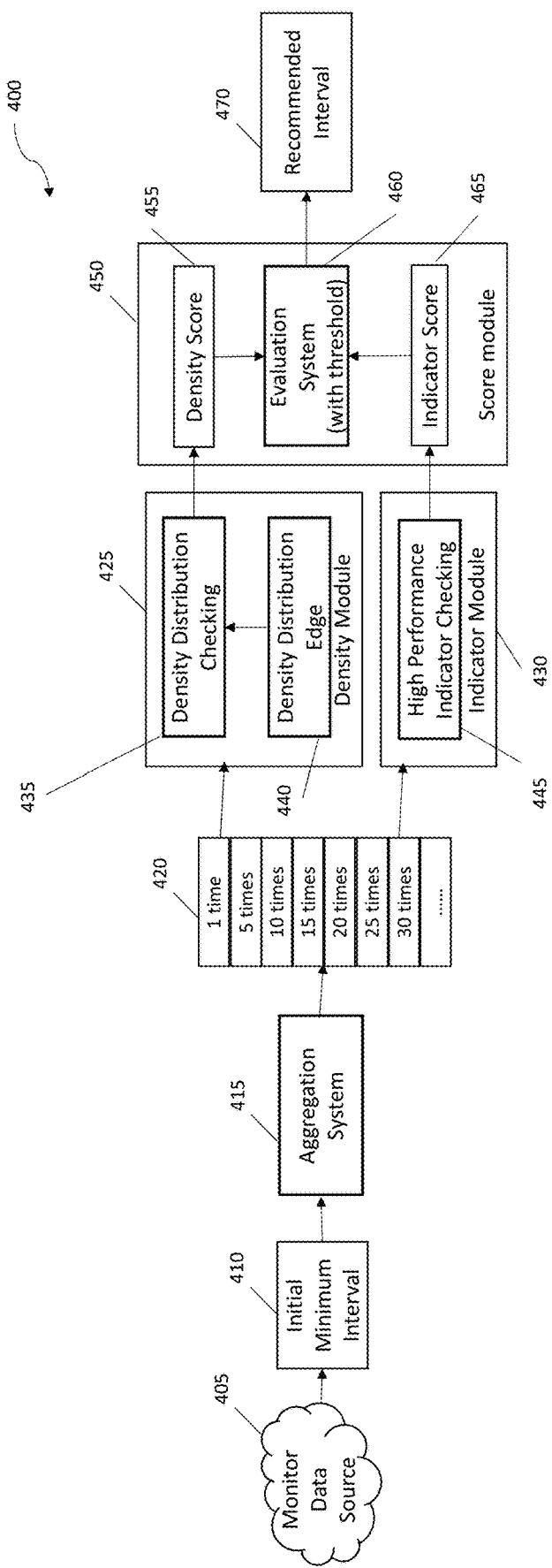
FIG. 4 depicts an interval recommendation system according to embodiments of the invention.

Turning now to a more detailed description of aspects of the present invention, FIG. 4 depicts an interval recommendation system 400 according to embodiments of the invention. Monitoring data source 405 generates data to be monitored by the system. Data is sampled by processor 305 at a minimum interval ("MI") 410 and is input into an aggregation system 415. The monitoring data from the aggregation module 415 is sampled by processor 305 at intervals of the minimum interval, e.g., one time, five times, 10 times, . . . , and 50 times, by sampler 420. The sampled data is provided to a density module 425 and an indicator module 430.

The density module 425 comprises a density distribution checking module 435 and a density distribution edge module 440. The density distribution edge module 440 identifies by processor 305 a density distribution edge. The density distribution checking module 435 receives the density distribution edge and for each set of aggregation data of MI that it receives a density score 455 is generated by processor 305 by the measurement of a density distribution function.

The granularity of density distribution is defined by the user, but, if not defined by the user, a default value is 10. When aggregate data with an initial minimum interval arrives in the aggregation module 415, the density distribution edge module 440 within the density module 425 determines by processor 305 the edge value of the density distribution. For example, if the default value of 10 is used, the lowest value of 10% will be identified as a value of $P_1$, 20% will be identified as a value of $P_2$, . . . , 100% will be identified as a value of $P_{10}$. Thus, there will be a set ($P_1$, $P_2$, $P_3$, . . . $P_n$) with each member of the set used as a Density Distribution Edge (DDE).

The calculation of Density Distribution Function by density distribution module 425 is:

$$F(x)=1-\int_{-\infty}^{x}P(X(\omega)),$$

where $X(\omega)$ is the aggregation data. Since the data is discrete, the equation can be rewritten as:

$$F(x)=P\{X(\omega)>x\}$$

Then for each input aggregation data with different interval j. There will be a $F_j(x)$.

The calculation of Density Distribution Checking by density distribution checking module 435 is:

For each $F_j(x)$ and $P_i$, calculate the value of $F_jP_i$ as:

$$F_j(P_i)=P\{X(\omega)>P_i\}$$

Then the density score generated out of density module 425 for each interval j will be:

$$D_j = \underset{i=1 \to n}{\text{Max}} \frac{\left|F_j(P_i) - \frac{i}{n}\right|}{\frac{i}{n}} = \underset{i=1 \to n}{\text{Max}}\left(\frac{nF_j(P_i)}{i} - 1\right)$$

As will be explained in further detail below, the indicator module 430 includes a high performance indicator checking module 445 that generates by processor 305 an indictor score 465 for each set of aggregation of data of MI by measurement of the high performance indictor. The score module 450 includes an evaluation system module 460 that performs by processor 305 an evaluation and provides a recommended sampling interval 470.

Figure 5:
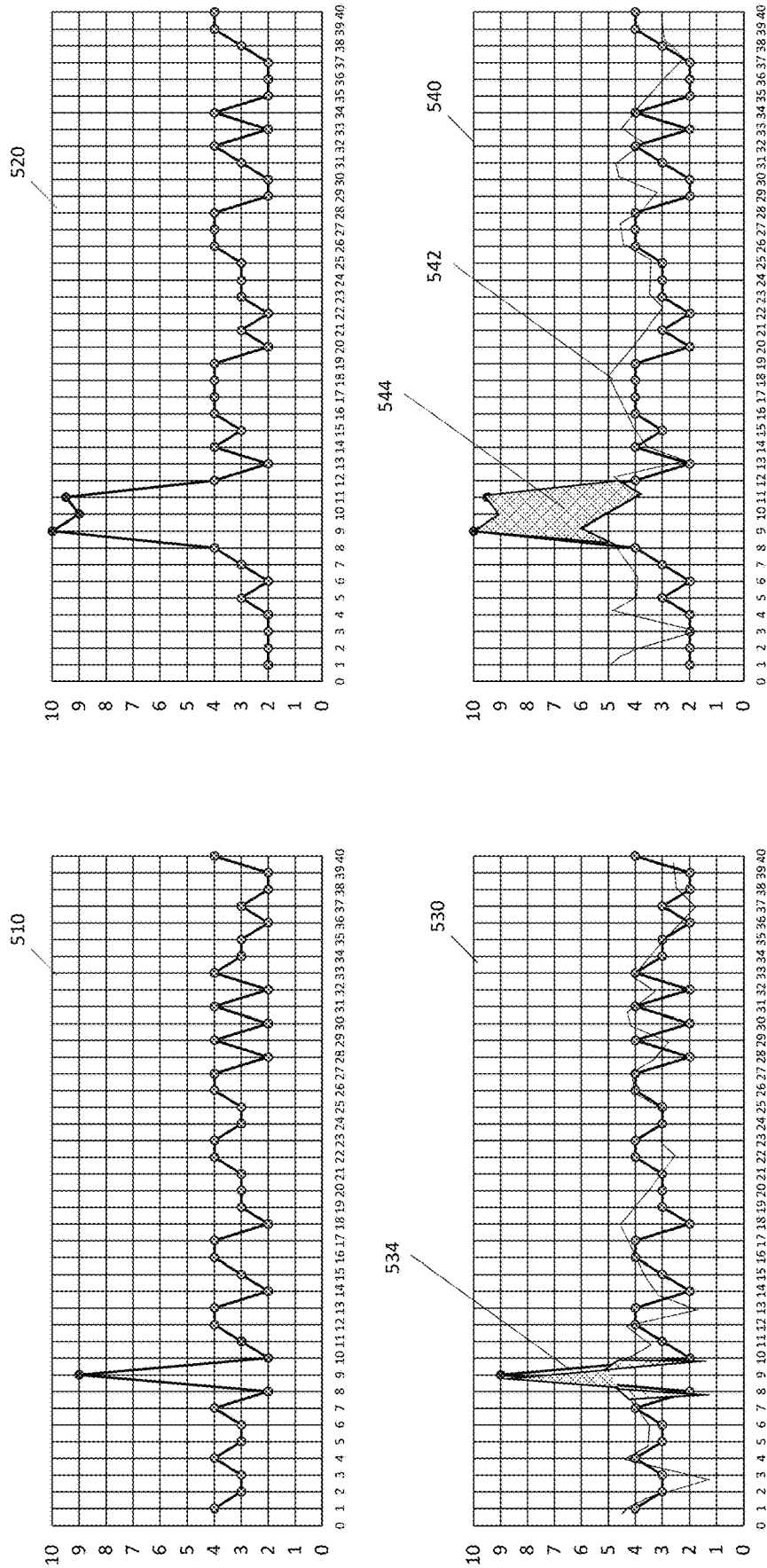
FIG. 5 depicts four graphs of the performance of monitoring data according to embodiments of the invention.

FIG. 5 depicts four graphs of the performance of monitoring data according to embodiments of the invention. For the discrete monitoring of data, a single peak point is meaningless in performance analysis. It may be that the sample is on a peak point. Consecutive peak points are ones which should have more attention paid to them. For example, data in graph 510 indicates a single peak point at sample 9, so that point may not be important. However, data in graph 520 indicates peak points at samples 9, 10, and 11 indicating a potentially bad situation to which attention should be paid.

To find these important issues, a new metric is introduced by calculating an overlapped area from a baseline to indicate the abnormal performance. The baseline is the line average value at the same time point. For example, adding the baselines 532 and 542 to graphs 510 and 520 yields graphs 530 and 540 showing overlapped areas 534 and 544. The problematic status is thus indicated more clearly.

The high performance indicator checking module 445 of indicator module 430 calculates a performance metric. for each piece of monitoring data i, the performance metric, or indicator score, $M_i$, is calculated by:

$M_i$=Max{0, $S_i-\bar{S}_i$}, where $S_i$ refers to the area under a monitoring curve while Si bar refers to an area under the baseline.

Figure 6:
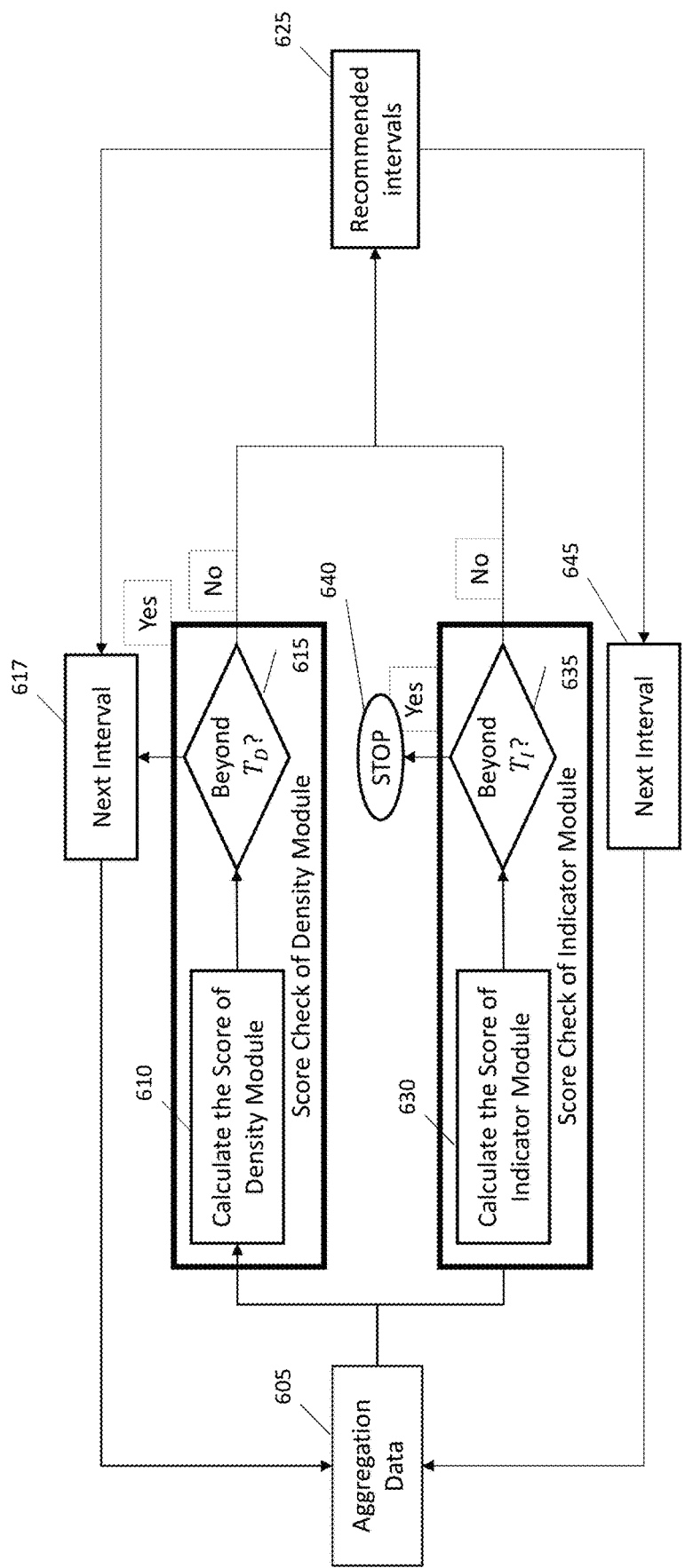
FIG. 6 depicts a flow chart of the recommendation system according to embodiments of the invention.

FIG. 6 depicts a flow chart of the recommendation system according to embodiments of the invention. Processor 305 assigns a series threshold $T(T_D,T_I)$ for the score, which means if the change rate reaches a threshold it will not be accepted (stage 605). By default, it is 5%, 10%, 20%, . . . 100%. $T_D$ is the density threshold for the density module 425. $T_I$ is the indicator threshold for indicator module 430. For each $T_D$ and $T_I$, there will be a set of recommended intervals which when achieved has a score that is less than the thresholds. These sets are marked as $x_D$ and $x_I$, so when a certain set of $T(T_D,T_I)$ is given, the recommended interval should be:

$$\text{Min}\left\{\max_{i \in X_D} i, \max_{j \in X_I} j\right\}$$

A series of data is generated by processor 305 that reflects a trade-off between the cost of the recommended interval for each $T(T_D,T_I)$ and the cost of the original data. Users can reference the output of the method and then choose one which is best for their own system.

In more general terms, the data from stage 605 is provided by processor 305 to the density module 425 and the indicator module 430. The density module 425 calculates by processor 305 a density score (stage 610) and a check is made by processor 305 to see if the density score is beyond $T_D$ (stage 615). If the density score is beyond $T_D$, then the next interval is set (stage 617) and retrieved by processor 305 from aggregation data (stage 605). If the density score is not beyond $T_D$ (stage 615), then the density score is provided by processor 305 to recommend an interval (stage 625).

The indicator module 430 calculates by processor 305 an interval score (stage 630) and a check is made by processor 305 to see if the interval score is beyond $T_D$ (stage 615). If the interval score is beyond $T_I$, then the next interval is set (stage 645) and retrieved from aggregation data (stage 605). If the interval score is not beyond $T_I$ (stage 635), then the interval score is provided by processor 305 to recommend an interval (stage 625). If the interval score is beyond $T_I$ (stage 635), then the method stops (stage 640).

The recommended interval may be provided as a user given expectation or as a list of $T(T_D,T_I)$. In another embodiment, during testing the system cost of recommended intervals of different $T(T_D,T_I)$ may be compared to the system cost of the initial minimum interval with performance degradation calculated as the change in cost divided by the cost at the initial minimum interval.

These may all be provided in a table.

FIG. 7 depicts three tables showing an example output of the method according to embodiments of the invention. In this example, an initial minimum interval is one second. $T_D$ and XD are assigned by a user as 3%, 5%, 8%, 10%, and 15%. Table 710 depicts a table of TD and XD that may be generated and Table 720 depicts a table of TI and XI that may be generated. The resulting tables are combined and provided in Table 730 that depicts the recommended intervals.

According to this table, a user can view the effect with the various monitoring intervals. They can be combined with the performance tests with the different intervals in Table 730 to see the system cost degradation (shown in parenthesis), which can be referred to aid the user in the decision of the monitor strategy. For example, if the user wants to decrease the system cost by more than 15% with minimum monitoring effect, the one min interval is the best interval for use.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for recommending a monitoring interval, comprising:
   receiving, by a processor, monitoring data at an initial monitoring interval;
   calculating, by the processor, a set of aggregation data from the monitoring data including a first subset of aggregation data at a first interval of the initial monitoring interval;
   calculating, by the processor, a first density score that indicates a percentage of the aggregation data included in the first subset of aggregation data and a first indicator score that indicates a rate of change of data values in the first subset of aggregation data during the first interval;
   providing, by the first processor, a system cost degradation associated with the first interval, the system cost degradation indicating an estimated percentage decrease in system resource cost resulting from utilizing the first interval as the monitoring interval instead of the initial monitoring interval; and
   providing, by the processor, the first interval as a recommended interval when the first density score does not exceed a density threshold, the first indicator threshold does not exceed an indicator threshold, and the system cost degradation meets a cost reduction threshold.

2. The computer-implemented method of claim 1 further comprising, calculating, by the processor, a second subset of aggregation data at a second interval of the initial monitoring interval, where the first interval and the second interval are not the same.

3. The computer-implemented method of claim 2 further comprising calculating, by the processor, a second density score for the second subset of aggregation data and a second indicator score for the second subset of aggregation data interval when the first density score exceeds the density threshold and the indicator threshold does not exceed the indicator threshold.

4. The computer-implemented method of claim 3 further comprising providing, by the processor, the second interval as the recommended interval when the second density score does not exceed the density threshold and the second indicator threshold does not exceed the indicator threshold.

5. The computer-implemented method of claim 1, wherein the first density score is calculated, by the processor, from the first subset of aggregation data based on a density distribution of the first subset of aggregation data.

6. The computer-implemented method of claim 1, wherein the first indicator score, Mi, is calculated, by the processor, by Mi=Max {0, Si−Si bar} where Si refers to the area under a monitoring curve while Si bar refers to an area under a baseline.

7. The computer-implemented method of claim 1, further comprising providing, by the processor, a table of a plurality of recommended intervals and associated system cost degradations.

8. A system comprising:
a processor;
a memory communicatively coupled to the processor, the memory having stored therein instructions that when executed cause the processor to:
receive monitoring data at an initial monitoring interval;
calculate a set of aggregation data from the monitoring data including a first subset of aggregation data at a first interval of the initial monitoring interval;
calculate a first density score that indicates a percentage of the aggregation data included in the first subset of aggregation data and a first indicator score that indicates a rate of change of data values in the first subset of aggregation data during the first interval;
provide a system cost degradation associated with the first interval, the system cost degradation indicating an estimated percentage decrease in system resource cost resulting from utilizing the first interval as the monitoring interval instead of the initial monitoring interval; and
provide the first interval as a recommended interval when the first density score does not exceed a density threshold, the first indicator threshold does not exceed an indicator threshold, and the system cost degradation meets a cost reduction threshold.

9. The system of claim 8 further comprising instructions that when executed by the processor calculate a second subset of aggregation data at a second interval of the initial monitoring interval, where the first interval and the second interval are not the same.

10. The system of claim 9 further comprising instructions that when executed by the processor calculate a second density score for the second subset of aggregation data and a second indicator score for the second subset of aggregation data interval when the first density score exceeds the density threshold and the indicator threshold does not exceed the indicator threshold.

11. The system of claim 10 further comprising instructions that when executed by the processor provide the second interval as the recommended interval when the second density score does not exceed the density threshold and the second indicator threshold does not exceed the indicator threshold.

12. The system of claim 8, wherein the first density score is calculated from the first subset of aggregation data based on a density distribution of the first subset of aggregation data.

13. The system of claim 8, wherein the first indicator score, Mi, is calculated by Mi=Max {0, Si−Si bar}, where Si refers to the area under a monitoring curve while Si bar refers to an area under a baseline.

14. The system of claim 8, further comprising providing, by the processor, a table of a plurality of recommended intervals and associated system cost degradations.

15. A computer program product for recommending a monitoring interval, the computer program product comprising a non-transitory computer readable storage medium having program instructions embodied therewith, the program instructions executable by a processor to cause the processor to:
receive monitoring data at an initial monitoring interval;
calculate a set of aggregation data from the monitoring data including a first subset of aggregation data at a first interval of the initial monitoring interval;
calculate a first density score that indicates a percentage of the aggregation data included in the first subset of aggregation data and a first indicator score that indicates a rate of change of data values in the first subset of aggregation data during the first interval;
provide a system cost degradation associated with the first interval, the system cost degradation indicating an estimated percentage decrease in system resource cost resulting from utilizing the first interval as the monitoring interval instead of the initial monitoring interval; and
provide the first interval as a recommended interval when the first density score does not exceed a density threshold and the first indicator threshold does not exceed an indicator threshold, and the system cost degradation meets a cost reduction threshold.

16. The computer program product of claim 15 further comprising instructions that when executed by the processor calculate a second subset of aggregation data at a second interval of the initial monitoring interval, where the first interval and the second interval are not the same.

17. The computer program product of claim 16 further comprising instructions that when executed by the processor calculate a second density score for the second subset of aggregation data and a second indicator score for the second subset of aggregation data interval when the first density score exceeds the density threshold and the indicator threshold does not exceed the indicator threshold.

18. The computer program product of claim 17 further comprising instructions that when executed by the processor provide the second interval as the recommended interval when the second density score does not exceed the density threshold and the second indicator threshold does not exceed the indicator threshold.

19. The computer program product of claim 15, wherein the first density score is calculated from the first subset of aggregation data based on a density distribution of the first subset of aggregation data.

20. The computer program product of claim 15, further comprising providing, by the processor, a table of a plurality of recommended intervals and associated system cost degradations.

* * * * *